Oct. 6, 1936.  D. D. McDERMOTT  2,056,476
HOIST
Filed Nov. 29, 1935
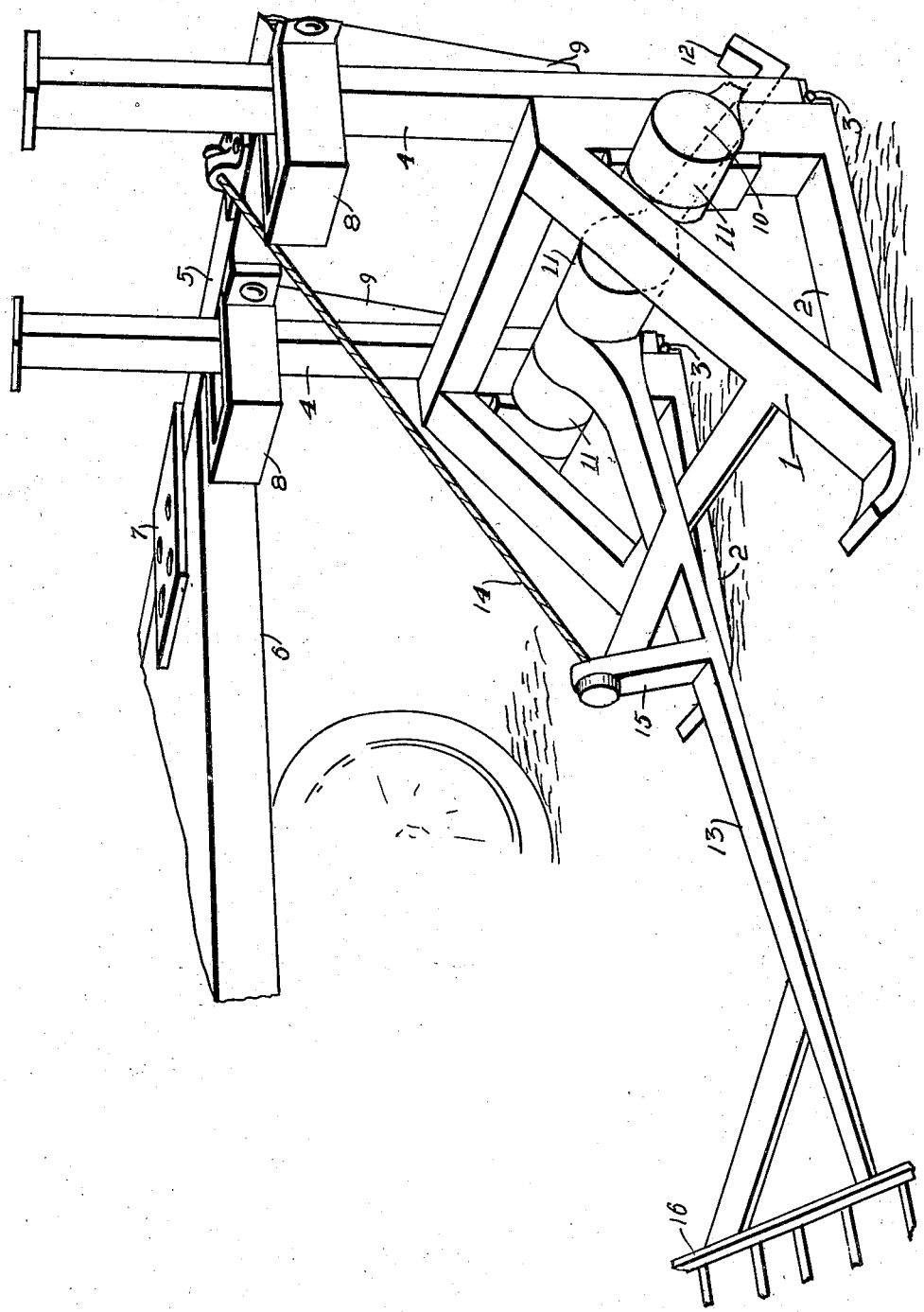
INVENTOR
Darwin D. McDermott
John A. Naismith
ATTORNEY Patented Oct. 6, 1936

2,056,476

UNITED STATES PATENT OFFICE 2,056,476

HOIST

Darwin D. McDermott, San Jose, Calif.

Application November 29, 1935, Serial No. 52,079

1 Claim. (Cl. 214—81)

The present invention relates particularly to a type of hoist to be used in conjunction with a vehicle such as a truck.

One object of the present invention is to provide a hoist operable to lift heavy loads such as baled hay, alfalfa and the like for loading on a truck.

It is another object of the invention to provide a hoist of the character indicated that may be removably attached to a truck and operated by movement of the truck relative to the body of the hoist.

It is still another object of the invention to provide a device of the character indicated that will be economical to manufacture, simple in form and construction, strong and durable, and highly efficient in its practical application.

In the drawing the illustration is a perspective view of a device embodying my invention mounted in operative relation to a truck and having parts broken away.

In the particular embodiment of the invention disclosed I show at 1 a heavy frame that is mounted on runners or shoes 2.

Hingedly mounted near the bottom of the rear of the frame as at 3 are vertical members 4 adapted to lie flat against the rear of the frame as shown.

A beam 5 is removably mounted on the rear end of a truck body 6 as at 7 to extend laterally in a horizontal plane beyond the body of the truck. The beam is fitted with yokes as 8 on its forward side, these yokes encompassing the members 4 and forming guides therefor. Braces as 9 are mounted on the under side of the beam 5, their forward faces engaging the rear sides of the members 4 when in a vertical position whereby forward movement of the truck will push the frame 1 forwardly on its shoes 2.

Mounted transversely on frame 1 is a shaft 10, and swingably mounted on the shaft are several rearwardly extending legs as 11 provided with feet as 12. These members 11—12 function as braces that drag freely behind the device when it is moving forwardly but automatically seating in the ground and preventing rearward movement of the frame when a rearwardly directed force is brought to bear thereon.

At 13 is shown a hoisting beam pivotally mounted on the shaft 10 to swing in a vertical plane and connected to the beam 5 through the medium of a cable 14 attached to a short upstanding part 15 on beam 13.

The hoisting beam 13 is fitted with any suitable device such as a fork 16 upon which the load is placed.

In using the device it is mounted on the truck body as described and the truck travels forwardly until a load is reached and placed upon the fork 16. After the load is in position the truck is driven backwardly. Since the beam 5 moves as a unit with the truck it operates through cable 14 and part 15 to exert a lifting force on the beam 13 and tends to move the whole structure backwardly with the truck. But this backward movement of frame 1 causes the members 11—12 to seek a solid footing in the ground and the movement of the frame 1 is thereby arrested. The continued rearward movement of the truck, with frame 1 being held stationary, effects the elevation of the hoisting beam until its forward end reaches a point where the load can be transferred to the truck.

In the above operation the members 4 swing backwardly on their hinges 3 and slide freely in the yokes 8, again assuming their normal vertical positions when the truck moves forward. The forward movement of the truck relative to frame 1 lowers the hoisting beam 13 into position to receive another load.

It is to be understood, of course, that while I have herein shown and described but one specific embodiment of the invention, changes in form, construction, and method of assembly and operation may be made within the scope of the appended claim.

I claim:

A device of the character described comprising, a vehicular ground travelling frame, ground engaging means pivotally associated therewith and projecting in one direction therefrom to prevent movement thereof in that direction, means associated with the frame but movable with respect thereto only in the direction of the ground engaging means, means for rigidly attaching said last mentioned means to a power actuated vehicle, a hoisting structure pivotally mounted on the frame to extend in the direction opposite to that of the ground engaging means, and connecting means between the hoisting structure and the power vehicle attachment whereby movement of the power vehicle in the direction of the ground engaging means will operate to raise the hoisting structure and its reverse movement to lower the same.

DARWIN D. McDERMOTT.